(12) United States Patent
Ferrari

(10) Patent No.: US 12,497,145 B2
(45) Date of Patent: Dec. 16, 2025

(54) INFLATION FLUID SUPPLY AND DISCHARGE ASSEMBLY, IN PARTICULAR FOR INFLATABLE DIVING EQUIPMENT, SUCH AS BUOYS, SURFACE-MARKER BUOYS, BALANCING JACKETS OR THE LIKE, AND INFLATABLE DIVING EQUIPMENT PROVIDED WITH SUCH ASSEMBLY

(71) Applicant: Ferplast S.r.l., Sori (IT)

(72) Inventor: Cristiano Ferrari, Sori (IT)

( * ) Notice: Subject to any disclaimer, the term of this patent is extended or adjusted under 35 U.S.C. 154(b) by 634 days.

(21) Appl. No.: 17/818,676

(22) Filed: Aug. 9, 2022

(65) Prior Publication Data

US 2023/0046200 A1    Feb. 16, 2023

(30) Foreign Application Priority Data

Aug. 10, 2021    (IT) .................. 102021000021671

(51) Int. Cl.
| | | |
|---|---|---|
| *B63C 11/08* | (2006.01) | |
| *B63C 7/10* | (2006.01) | |
| *F16K 15/02* | (2006.01) | |
| *B63B 22/08* | (2006.01) | |

(52) U.S. Cl.
CPC ............. *B63C 11/08* (2013.01); *B63C 7/10* (2013.01); *F16K 15/028* (2013.01); *B63B 22/08* (2013.01)

(58) Field of Classification Search
CPC ... B63C 11/08; B63C 7/10; B63C 9/24; F16K 15/028; F16K 15/148; F16K 15/202; F16K 15/207; F16K 17/196; B63B 22/08
See application file for complete search history.

(56) References Cited

U.S. PATENT DOCUMENTS

| | | | |
|---|---|---|---|
| 7,438,081 B1 | 10/2008 | Chen | |
| 2016/0167752 A1* | 6/2016 | Sinclair | .................. F16K 15/18 137/522 |

OTHER PUBLICATIONS

Italian Patent and Trademark Office, Search Report, May 2, 2022.

* cited by examiner

*Primary Examiner* — Andrew Polay
(74) *Attorney, Agent, or Firm* — Themis Law

(57) ABSTRACT

An inflation fluid supply and discharge assembly includes a combined two-way inlet and outlet valve having a valve body with two separate flow paths separated for flows in opposite directions. Each flow path is associated with a valve seat with a shutter, which cooperates with the valve seat in the manner of a non-return valve. One of the flow paths, intended for the passage of an incoming flow to a collection body, can be connected to a fluid supply source, the other flow path enabling the passage of a discharge flow from the collection body. A shutter is stably stressed against the corresponding valve seat, in a position of interdiction of the discharge or outlet flow, and is moved to a position at a distance from the valve seat by control members or automatically by a predetermined overpressure condition of the fluid in the collection body.

16 Claims, 8 Drawing Sheets

INFLATION FLUID SUPPLY AND DISCHARGE ASSEMBLY, IN PARTICULAR FOR INFLATABLE DIVING EQUIPMENT, SUCH AS BUOYS, SURFACE-MARKER BUOYS, BALANCING JACKETS OR THE LIKE, AND INFLATABLE DIVING EQUIPMENT PROVIDED WITH SUCH ASSEMBLY

FIELD OF THE INVENTION

The invention relates to an inflation fluid supply and discharge assembly, in particular for inflatable diving equipment, such as buoys, surface-marker buoys, balancing jackets or the like.

BACKGROUND OF THE INVENTION

Typically, inflatable devices such as life jackets, balancing vests, inflatable signaling buoys and also signaling buoys called surface-marker buoys consist of a bag having a predetermined shape, which bag comprises at least one opening for feeding the inflation fluid, such as air or other gases or gas mixtures and an exhaust opening to which a normally closed exhaust valve is associated and which can be opened thanks to a direct action to control the displacement of the valve shutter in a position away from the valve seat or thanks to a thrust exerted by the pressure of the fluid inside the bag when this pressure exceeds a predetermined threshold value.

The supply or inflation opening is generally associated with a tubular supply duct which is provided with a non-return valve configured in such a way as to open automatically in the presence of an inlet fluid flow having a predetermined supply pressure and to automatically close when the pressure of the inlet fluid flow falls below a certain minimum value, automatically preventing the fluid fed into the bag from escaping.

Typically, the simplest life jackets and also the diving buoys for underwater use, provide that the tubular supply duct is in the form of an inflation pipette with one end fastening sealingly to the bag in correspondence with the supply opening of the inflation fluid which one end is connected to a tubular supply terminal by means of an elbow bend of about 90° to an inflation terminal, in such a way that said inflation terminal extends with its axis substantially parallel or tangential to the surface of the bag respectively in a deflated condition and in an inflated condition. This inflation terminal has a relatively large length in order to be able to protrude beyond a perimeter edge of the bag both in the deflated and in the inflated condition and to allow a terminal of a pressure fluid supply duct to be coupled to said inflation terminal or to allow placing the end of said inflation terminal in the mouth of a user for manual inflation. The fastening end of the pipette to the bag at the supply opening is relatively short in order to reduce the protrusion of the pipette from the wall of the bag.

The discharge valve can be of different types, but is generally of the type shown in FIG. 2 and includes a valve body tightly fixed to the wall band of the bag that surrounds the edge of the discharge opening.

Typically, both the inflation pipette and the discharge valve are arranged relatively close to each other as shown in FIG. 1 being the corresponding discharge and inflation openings provided substantially side by side with each other at a certain distance from each other. FIG. 1 shows a broken view of the two ends of a buoy for underwater use. The bag has a relatively long rectangular shape in the deflated condition and becomes substantially cylindrical in the inflated condition. At one end of the bag 22 there is provided the inflation pipette indicated with 100 and with which the non-return valve is associated, which prevents the inflating fluid from escaping. The inflation pipette 100 is provided at its fastening end to the bag 22 with a fixing flange to a perimeter band surrounding the inflation opening of the bag 22. The sealing can be done by any chemical/physical adhesion method, such as bonding and/or welding.

Next to the inflation opening to which the inflation pipette 100 is tightly fixed there is a discharge opening to which it is fixed by chemical/physical adhesion, an exhaust valve as will be described in more detail with reference to FIG. 2. Discharge valve 21 generally has the double function of discharge valve which can be opened on command thanks to the cable 27 or of overpressure valve which opens automatically when the pressure of the fluid inside the bag 22 exceeds a predetermined maximum value.

An example of the exhaust valve provided, for example on the diving buoys is illustrated in FIG. 2. These exhaust valves generally consist of a main body 21 provided with a valve seat 23 against which a flat seal 24 of a shutter acts. The gasket 23 is kept in the closed position by a hard disk 25 stressed by a calibrated cylindrical helical spring 26. The hard disk 25 is provided with a raised seat 29 to allow the connection of a coupling terminal 28 of a traction member, such as for example a control cable 27 and the whole is enclosed by a covering cap 212, fixed to the body 21 preferably in a removable way.

In a non-limiting way, the cover cap 212 has a cylindrical wall section provided with an internal thread with which it is screwed onto an external thread of a collar 210 of the main body 21 which is carried radially inside the peripheral fixing flange 321 of the body 21 for example to a peripheral boundary band of an opening in a wall of an inflatable hollow body indicated with 22.

The cover cap 212 keeps the spring 26 compressed in its calibrated load position against the side of the hard disk 25 which carries the seal 24 of the shutter. The spring 26 stably pushes the shutter against the valve seat 23, holding it stably and with a predetermined force in the closing position of the valve.

The valve is opened manually, by lifting the hard disk 25 and the flat gasket 24 associated with it by means of manual traction and/or by means of a motorized actuator of the control cable 27, 28, or the opening of the valve also occurs automatically, when the pressure inside the inflatable hollow body to which the valve is applied is such as to overcome the thrust of the calibrated spring 26 against the hard disk 25 and the flat gasket 24.

The valve body 21 is generally welded at high frequency on the flexible material (thermoplastic elastomer) used for the inflatable hollow body 22.

The actuating member of the shutter 24, 25, i.e., in this case, the cable 27, is made to pass inside the valve, i.e., in the compartment delimited by the cover cap 212 through a hole 222 provided in the upper wall of the cover cap 212. Furthermore, a plurality of openings through which the discharged fluid passes when the shutter 24, 25 is moved to the valve opening position, that is, removed from the seat 23, is provided in the annular band of the upper wall of the cover cap 212 which surrounds said hole 222.

The perimeter edge of the upper wall of the cover 212 which in this case is convex towards the outside and concave towards the inside of the valve, is connected to a cylindrical end portion 232 of the cover 212 which has the internal thread of engagement with the external thread of the collar 210, said cylindrical portion 232 and said collar therefore having internal and external diameters respectively dimensionally matched to each other.

As is evident, the discharge valve 21 also has a certain height and therefore protrudes to an extent substantially similar to that of the pipette from the wall of the bag 2.

From the above, it is clear that although the solution envisaged in the state of the art is functional, this solution has some drawbacks.

A first drawback relates to the guarantee of tightness, because in the known configuration, the bag has two openings to which the discharge valve and the inflation pipette must be connected in a sealed manner and in a safe and stable manner over time.

A further drawback consists in the cost of the material and of production. In fact, at least three construction parts are required for the manufacture of the diving buoy, which must be kept in stock or in any case be available.

Furthermore, the production process requires two operational steps of sealingly fastening, such as welding, and therefore makes the production process more expensive and complex.

Document U.S. Pat. No. 7,438,081 discloses a valve for an inflatable element which includes both inflate/deflate and pressure release functions. The valve has a housing that receives a core, a spring and a nut. The nut is threaded into the core and is slidably into the housing and holds the core and the spring in place within the housing. The inflation function includes a one-way valve and the release valve provides that the shutter can be mechanically locked in the closed condition thanks to mechanical locking members that can be engaged and disengaged with respect to retaining stops in the closed position.

SUMMARY OF THE INVENTION

The present invention has the purpose of realizing a unit for feeding and discharging inflation fluids, in particular, for inflatable underwater equipment, such as buoys, diving buoys or the like, which, thanks to simple and inexpensive measures, allows to overcome the drawbacks described above, without limiting the inflation and deflation efficiency and increasing safety and lowering production costs, too compared to the state of the art.

The invention achieves the aforementioned purposes with a unit for feeding and discharging inflation fluids, in particular for inflatable diving equipment, such as buoys, diving buoys or the like, which unit comprises a two-way flow valve, respectively an inlet and an exhaust path, in which said valve is constituted by a valve body in which there are said two flow paths which are separate from each other and are respectively intended for flows having opposite directions, while each of the two flow paths are associated with a non-return valve which prevents the flow in the opposite direction to the flow direction foreseen for the corresponding flow path and allows automatically or on command the passage of the flow in the flow direction foreseen for the corresponding path of flow.

The non-return valves each consist of a valve seat provided in a predetermined position along the path of a corresponding flow path, with which valve seat a shutter cooperates, the combination of shutter and valve seat being configured to automatically close the flow of fluid having the opposite direction to that for which the corresponding flow path is intended.

According to a feature, one of the flow paths is intended for the passage of an incoming flow to a collection body, such as an inflatable bag or a rigid tank, or the like, and has a terminal duct for coupling to a power source of a inflation fluid, in particular air or a gas, having a predetermined supply overpressure and the corresponding non-return valve automatically assumes the closed and open position according to the pressure of the inflation fluid flow, while the other flow path is intended for the passage of a discharge or outlet flow of said fluid from said collection body, the shutter of the non-return valve being stably and automatically stressed against the corresponding valve seat, in a position where the discharge or exit flow is cut off by an elastic element with a predetermined force and the shutter being moved into an opening position that is, a position of distancing from the valve seat, by means of manual or motorized control devices for the displacement of said shutter and/or also automatically from a condition of overpressure of the fluid in said collection body when said overpressure generates a thrust force on the shutter which is higher than that one exerted by the elastic element.

Advantageously, in one embodiment, the movement of the shutter of the non-return valve provided in the discharge or outlet flow path between the two extreme positions, respectively of interdiction of said outlet flow and release of said outlet flow is determined only by the combination of the force of the elastic element on the shutter in the closing direction of the non-return valve and the force exerted by manual and/or motorized action against the force of the elastic element, for moving the shutter of the non-return valve into an opening position, since the movement path of said shutter between said two positions is devoid of removable mechanical stops.

Different embodiments of the inflation and discharge unit according to the present invention are possible.

In a preferred embodiment, the inflation and discharge unit has a rotationally symmetrical shape, for example circular and the two flow paths or ways are coaxial to each other, a central and radially innermost flow path ending on the side facing towards the collection body with a membrane non-return valve which overlaps the face of a valve seat facing the inside of the collection body, on the side of said face facing the collection body and a flow path which is annular and coaxially surrounds the central inflation or supply flow path, the flow paths being separated by a tubular wall which externally delimits the central flow path and internally the annular flow path, while the associated valve seat to said annular flow path is also annular in shape, and cooperates with an annular shutter, said valve seat having at least one annular sealing lip with which an annular perimeter band of said shutter cooperates and which sealing lip is provided radially outermost to at least one passage opening for said discharge or outlet flow.

In one embodiment, the sealing gasket is in the form of a disc which is stably fixed at a radially innermost diameter thereof, while the annular perimeter band cooperates with the annular sealing lip of the valve seat and can be raised from a position of contact with the same one in which it generates a seal with said annular sealing lip to a position, raised from said sealing lip, in which it opens the passage in the discharge or outlet direction.

In an alternative embodiment, the valve seat delimits said annular flow path by presenting two concentric circular walls with two sealing lips intended to cooperate with an annular shutter having a radial width such as to overlap both the annular sealing lips of the valve seat and which shutter is subjected to the action of an elastic element which stably urges it in the closed position against said valve seat, acting on the side of said valve seat opposite the inside the collection body.

According to an embodiment, the central flow path comprises an angled pipette-like duct with a terminal branch coaxial to the annular flow path or to the corresponding annular valve seat and with an opposite radial terminal branch which is oriented substantially at 90° with respect to said coaxial branch, while the length of the coaxial branch is such that the radial branch protrudes only for part of its diameter beyond the external dimensions of the valve.

In one embodiment, the second annular flow path opens into an annular chamber which is internally delimited by the wall of the coaxial branch of the duct for the first flow path and externally by a cylindrical coaxial collar which carries internally the radially outermost sealing lip of the annular valve seat of the second annular flow path and further at the top by a ring nut for fixing a covering element and said central angled duct and which ring nut can be removably fixed to said cylindrical collar, while the covering element constitutes a stationary abutment for the elastic element, i.e. a helical spring which stably urges the annular shutter against the annular valve seat.

According to a further feature, in a position radially adjacent to the angled duct, the annular shutter has an axial extension which protrudes from the covering element and to which a manually operated tie rod can be fixed for the manual displacement of the shutter in the open condition of the valve against the action of the elastic element.

According to one feature, when there is only one sealing lip coaxial to the axial portion of the central duct, the shutter gasket, cooperating with the sealing lip of the valve seat of the exhaust flow path, is fixed stably and sealingly with a radially innermost annular edge thereof in correspondence with or to the wall of said coaxial section of the central duct, a radially internal perimeter band provided along said radially innermost edge being clamped between said coaxial section of the central duct and a central hub connecting to the cylindrical collar by means of radial ribs.

On the other hand, when the valve seat has an annular opening delimited by two coaxial sealing lips, the annular sealing lip of the annular seat which is radially innermost consists of a coaxial central hub which is held in position by radial connecting ribs to the cylindrical collar or to the radially outermost sealing lip of said annular valve seat.

According to another feature that can be provided in both the variants described above, the central hub has a conical extension coaxial to the angled duct, or to the coaxial branch of the same and has a coaxial hub for fixing a central appendix of a diaphragm shutter consisting of a circular disc in a central coaxial position.

According to a further feature, the valve seat associated with the non-return valve for the inflation flow path through the central angled duct and cooperating with the diaphragm shutter is provided integrally shaped on the side of the central hub facing the inside the collection body.

In one embodiment, the membrane shutter is an umbrella shutter.

In one embodiment, the valve seat for the diaphragm shutter substantially coincides radially with the radially internal sealing lip of the annular valve seat being said radially internal sealing lip of the annular valve seat and said valve seat of the umbrella shutter provided on opposite sides of a radial annular enlargement of said central hub.

According to another advantageous feature, the cover element is made of one piece with the radial branch of the central duct for the inflation flow path and is in the form of a coaxial and radial flange with respect to the axis of the coaxial branch of said angled duct.

Still according to an embodiment that can be provided in any combination with one or more of the features described above, the cylindrical collar extends radially outwards in an annular fixing flange which is intended for sealingly connecting with an annular band that surrounds a passage opening in the wall of the collection body.

It is also evident that according to yet another constructional embodiment the annular flange, the cylindrical collar, the annular valve seat, the central hub and the valve seat for the umbrella valve opposite the annular valve seat are constituted by a single constructive body of a single material.

In this case, the additional construction parts consist of the two shutters, the elastic element, the angled duct combined as one piece with the cover element, the annular shutter actuation member and the tightening ring nut.

The constructive simplicity of the assembly according to the invention therefore appears immediately.

Further features of the assembly described above are the subject of the sub-claims.

The invention relates to an inflatable diving equipment, such as a buoy, a diving buoy or the like, provided with an inflatable bag with an inflation and discharge opening to which an inflation and discharge unit is sealingly attached and which is made according to one or more of the features and/or embodiments described above.

Compared to the state of the art referred to, for example in FIG. 1, the inflatable bag requires only one opening for fixing the assembly and not two, thus halving the danger that leakage can be generated due to malformations during production and/or over time breakages.

The assembly according to the invention does not protrude beyond the wall of the bag to a much greater extent than the valves and/or the inflation terminals of the state of the art and is indeed substantially of the same order of magnitude relative to this protrusion.

BRIEF DESCRIPTION OF THE DRAWINGS

Other features and advantages of the present invention will appear more clearly in the course of the following detailed description of a particular embodiment, given by way of non-limiting example and being made with reference to the attached drawing, in which.

DETAILED DESCRIPTION OF EMBODIMENTS OF THE INVENTION

Figure 1:
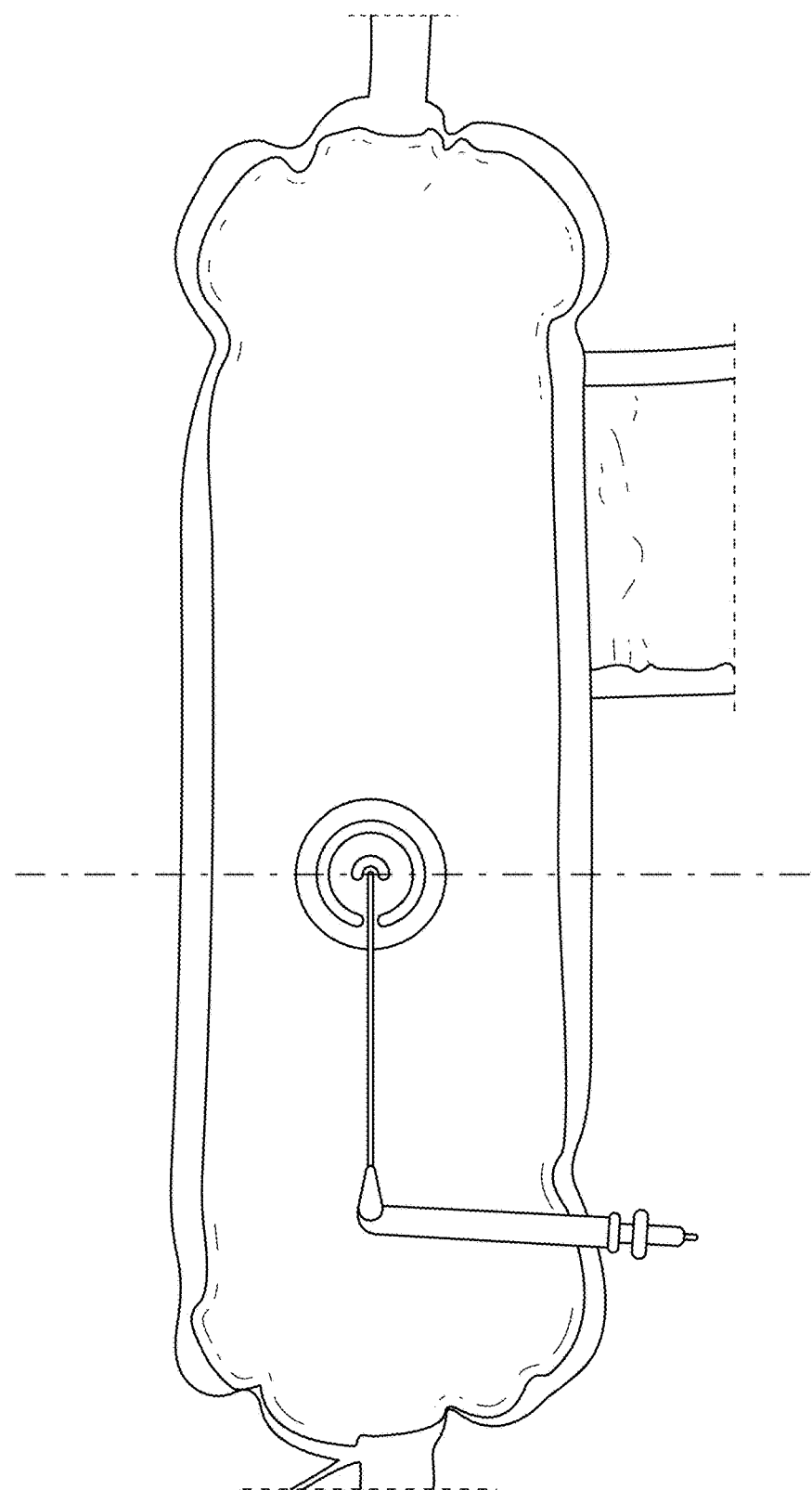
FIG. 1 is a broken plan view of the two ends of a so-called diving buoy according to the state of the art.
Figure 2:
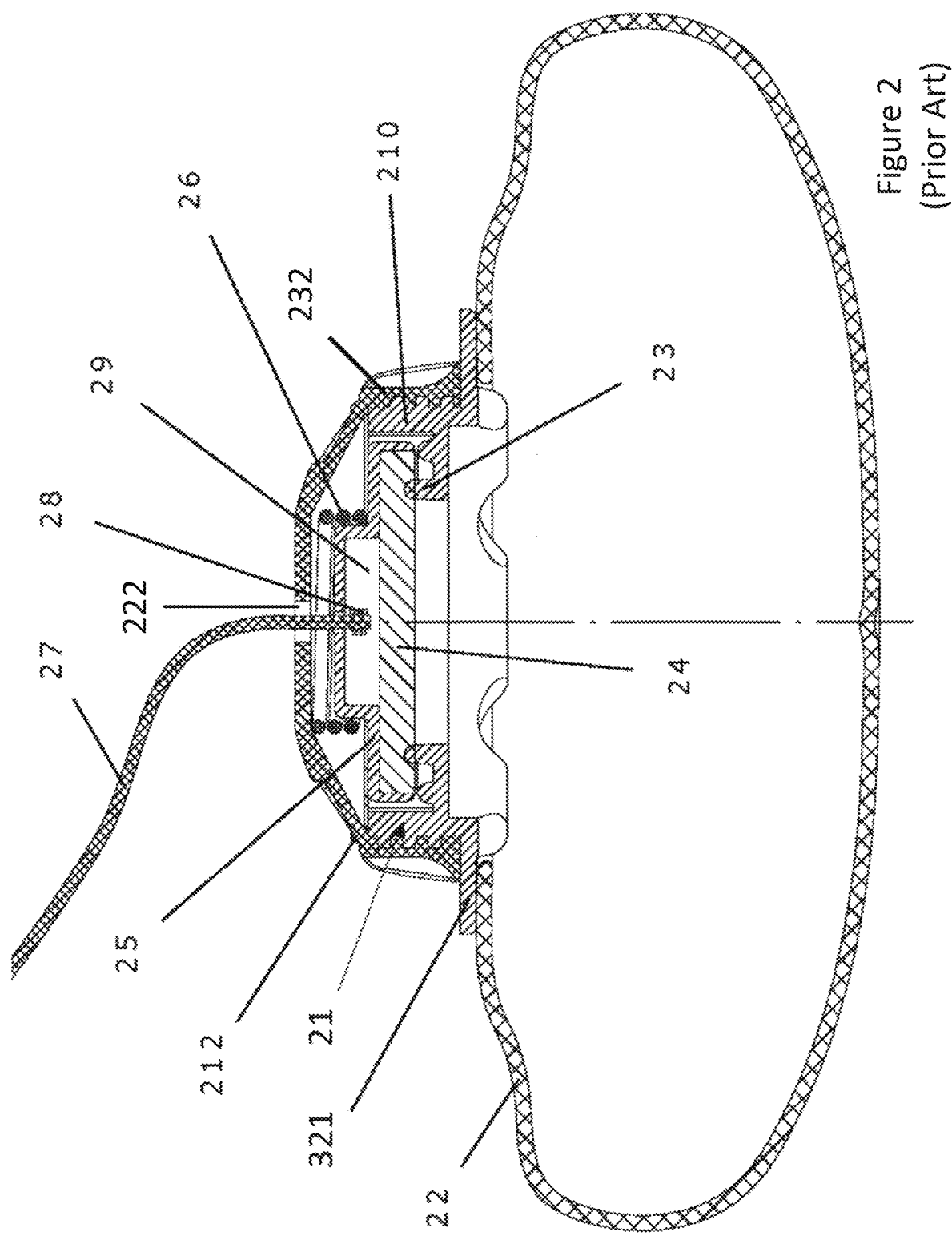
FIG. 2 is a schematic cross-sectional view of an example of an exhaust valve used in the inflatable diving equipment and in the diving buoy of FIG. 1.
Figure 3:
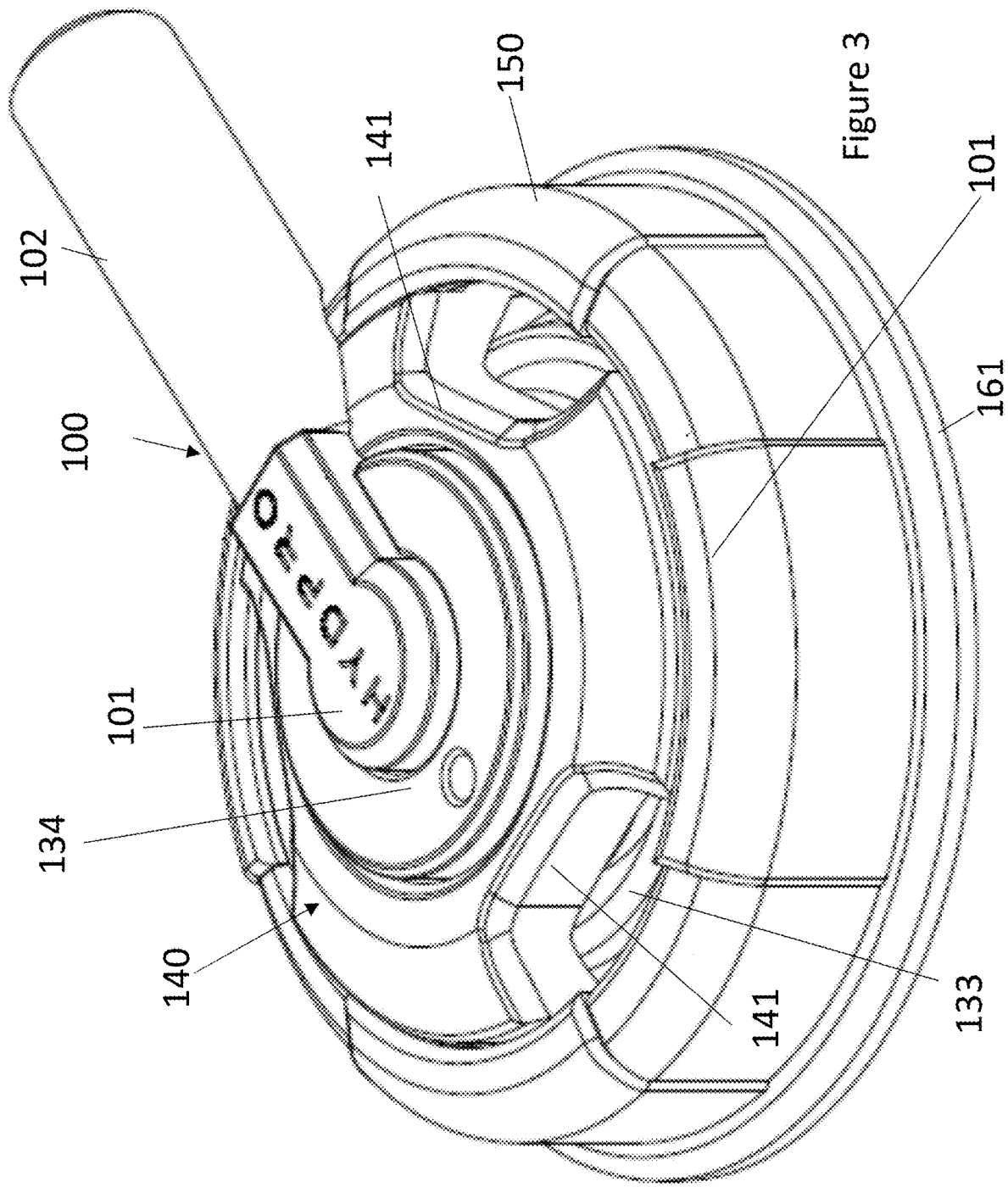
FIG. 3 is a schematic perspective view from above on an inflation and discharge unit according to an embodiment of the present invention.
Figure 4:
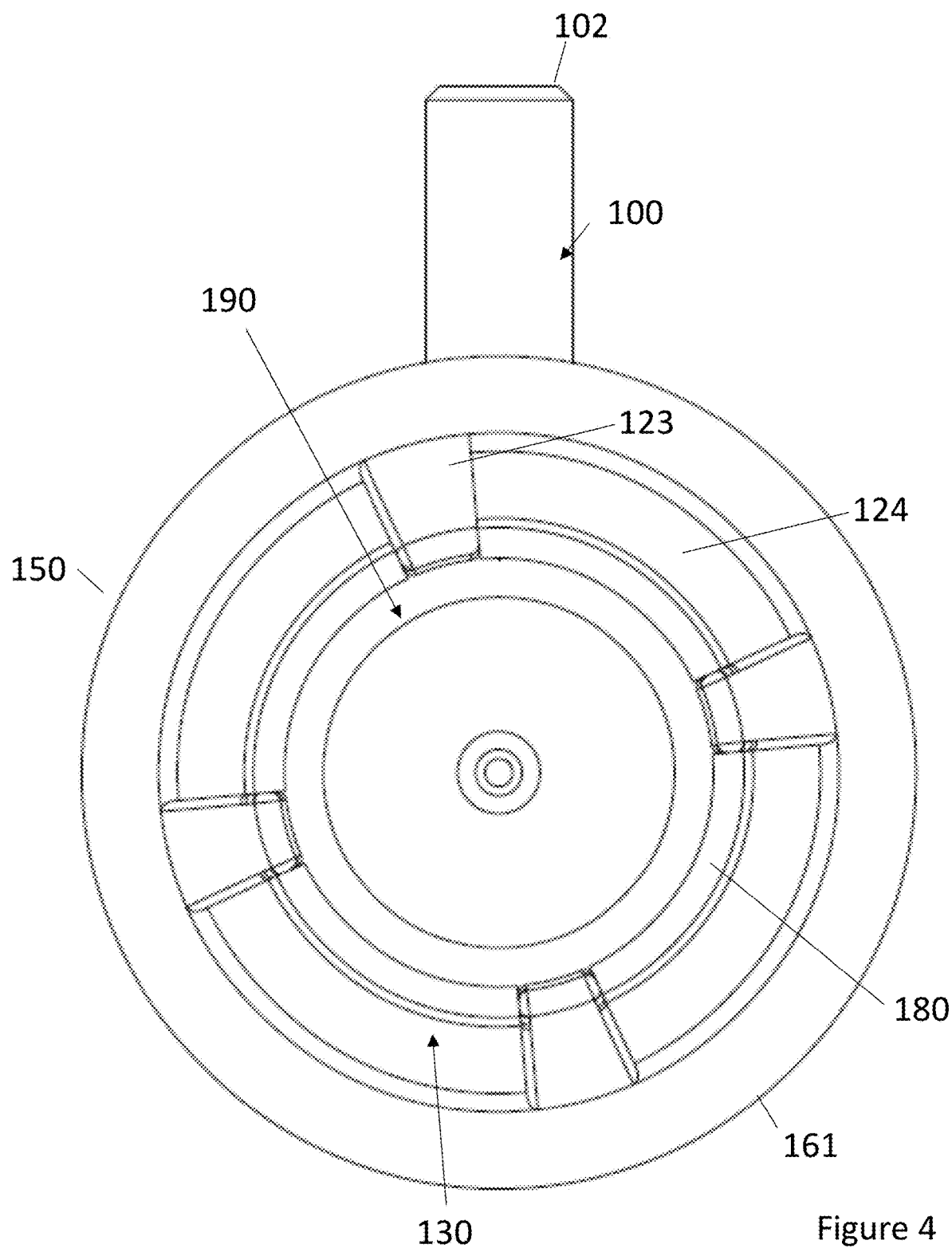
FIG. 4 is a bottom plan view of the unit according to FIG. 3.

With reference to FIGS. 3 to 7, an inflation and discharge unit for a hollow body such as an inflatable bag of a diving buoy or an inflatable bag of a buoy comprises two flow paths that are separate from each other and respectively provided only for an inlet flow of fluid to the hollow body indicated by the arrow G and for a discharge flow of fluid, i.e., an exhaust flow indicated by the arrow U.

In each of the two flow paths G and U there is a non-return valve which is configured to automatically shut off the flow of said fluid in the direction opposite to that provided for the corresponding flow path.

As shown in the figures, the unit is configured to provide the two flow paths for the inflation flow G and for the discharge flow U in a coaxial position, the flow path for the inflation flow G being provided at least in its terminal part by a central duct 101, while the flow path for the outlet flow U has an annular passage opening which is coaxial to the central duct.

The central duct 101 is constituted by a branch of an angled tube 100 which has a second branch 102 oriented radially outwards with respect to the axis of the central branch 101 and which ends beyond an external peripheral wall of the unit which is constituted by a clamping ring 150.

The annular flow path for the outlet flow U has an annular valve seat 120 which is formed by two concentric coaxial sealing lips 121, 122, which are radially connected to each other by spokes 123 having a predetermined width in the direction of the circumference and which are angularly spaced apart so as to leave open annular passage sectors 124 which are interposed between two adjacent spokes 123.

An annular shutter is provided on the side of the two sealing lips 121, 122, or on the side of the annular valve seat 120 facing in the outlet direction, i.e., opposite the internal space of the hollow body to which the assembly is intended to be coupled.

The annular shutter 130 is composed of an annular gasket 131 cooperating with the sealing lips 121, 122 presenting a radial width such as to overlap at the same time and both said sealing lips. The annular gasket 131 is mounted in a rigid annular support 132 coupled to the side of the annular gasket opposite the annular valve seat 120 and against the rigid annular support rests one end of an elastic element, for example the helical spring 133, whose opposite end rests on a covering element 140 which can be fixed in a stable position.

In a position adjacent to the central branch 101 of the duct for the inflation flow G, the annular support 130 has an axial extension 134 for fixing a traction member of the annular shutter 130, for example a cable as shown in FIG. 1.

The helical spring 133 is loaded with a certain force against the shutter 130 and urges said shutter stably in the contact condition against the valve seat 120, i.e., in the condition of closure of the flow path for the outlet flow U.

The traction member allows to manually move said annular shutter 130 away from the annular valve seat 120, opening the flow path for the discharge flow at the outlet U.

Furthermore, by suitably calibrating the force exerted by the spring 133 on the shutter 130, it is also possible to provide an automatic operation similar to an overpressure discharge valve, when for example the internal pressure of the inflation fluid in a hollow body exceeds a predetermined limit and exerts a lifting force of the annular shutter 130 from the valve seat 120 which exceeds that of the spring 133.

The cover element 140 has one or more discharge openings for the outflow indicated with 141.

It is held in a stable position by a peripheral annular locking ring 150 which is coupled by means of an internal thread to an external thread of a cylindrical collar 160.

The cylindrical collar 160 carries radially inside it a radial annular rib which forms the outer annular sealing lip 121 of the annular sealing valve seat 120.

From the radially external side or from the base of said side of the cylindrical collar 160 an annular flange 161 protrude radially for fixing the inflation and unloading unit to an annular band delimiting an opening provided in the wall of a hollow body to which band it is sealingly fixed.

It is possible to provide any type of sealing fastening of the type for example with chemical/physical adhesion. Typically, the sealing takes place by welding the annular band that surrounds the opening with the external annular flange 161.

The clamping ring 150 has a radially internal annular extension which is intended to overlap on a peripheral band of the covering element 140.

Figure 5:
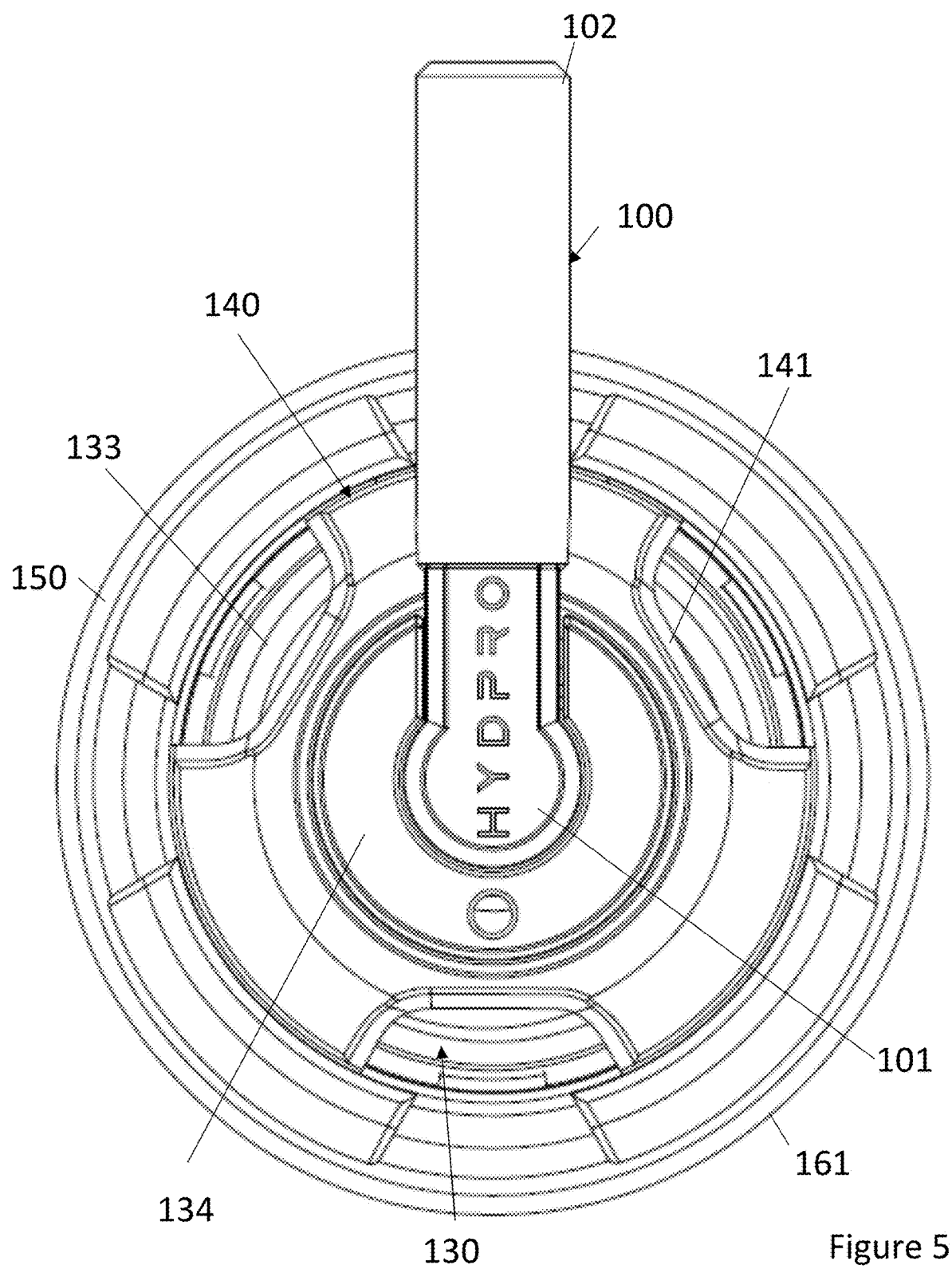
FIG. 5 is a top plan view of the unit according to FIG. 3.
Figure 6:
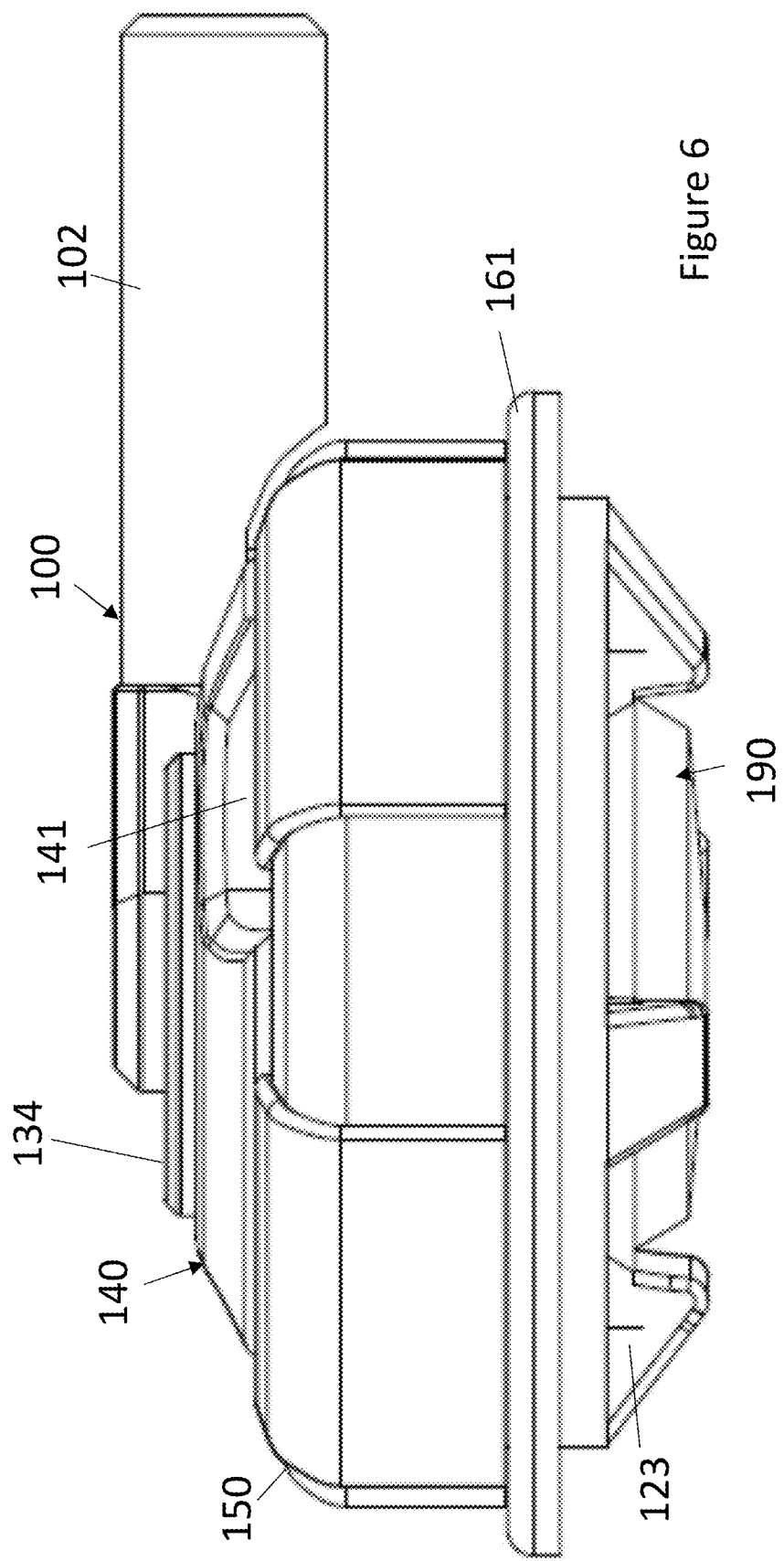
FIG. 6 is a side elevation view in a direction perpendicular to the radial branch of the central angled duct for the fluid flow of inflation.

In the illustrated embodiment and as shown in FIG. 5, the covering element 140 has three angularly equidistant openings 141, which openings are separated from each other by wall sectors which extend radially to form sectors of a peripheral annular band on which the internal radial fin of the clamping ring 140 overlaps.

The central branch 101 of the angled central duct 100 for the fluid flow of inflation G extends coaxially inside the annular valve seat and is engaged with one of its terminal sections in a cylindrical cup formed in a central conical hub 180 which branches off with its end facing the hollow body, i.e. opposite the cover element 140, in the opposite direction to the inflation flow G, from an annular element on which there is provided the radially innermost annular sealing lip 122 of the annular sealing gasket 120.

In the area substantially coinciding with said radially innermost annular sealing lip 122 but on the opposite side of said annular element which forms the end of the conical central hub 180, there is provided the valve seat 181 for a diaphragm shutter 190 which in the embodiment illustrated is in the form of a so-called circular umbrella shutter.

On the side of the central duct 100 facing the central branch 101, the umbrella shutter 190 has a coaxial fixing appendix 191 which is engaged by means of an elastic interlocking coupling in a hole of a central bushing 182 which is held in position coaxially to the central conical hub 180 and to the central branch 101 by means of radial ribs 183.

The central branch 101 of the central duct connects with an elbow deviation to the radial branch 102 and the axial length of the central branch 101 is dimensioned in such a way, so that the axis of the central duct is provided substantially close to or flush with the outer surface of the cover cap 140.

In this way, the radial branch 102 does not substantially protrude beyond the overall dimensions that a traditional exhaust valve such as the one shown in FIG. 1 would have.

In a possible embodiment, the cover cap 140 can form an integral part with the angled central duct 100.

In a variant embodiment, such as the one illustrated, the cover cap 140 has an upper cutout into which at least part of the diametrical dimension of the radial branch 102 of the angled duct 100 can penetrate. In this case, advantageously, the wall of the radial branch acts at least in part also as a stop for the coil spring.

As can also be seen from FIG. 5, the tightening ring 150 overlaps the cover cap 140 which has a circular opening in the central area that forms an axial sliding seat of the axial extension of the annular shutter.

The angled duct 100 is fixed inside the central hub 180.

Figure 7:
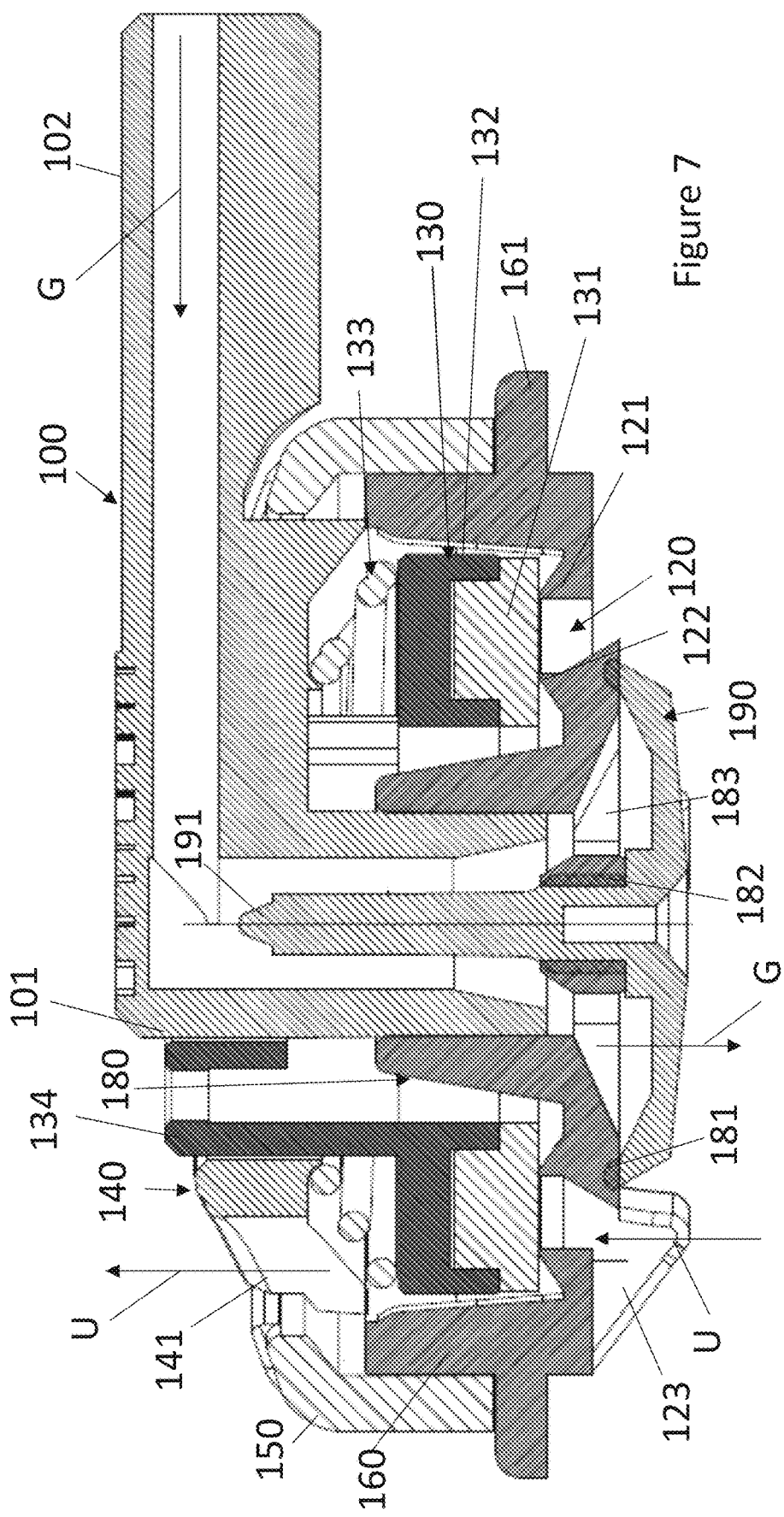
FIG. 7 is a sectional view of the unit according to the previous FIGS. 3 to 6 along a diametrical plane and coinciding with the axes of the two branches of the central angled duct for the fluid flow of inflation.

Still according to a feature as shown in FIG. 7, the external annular fixing flange 161, the cylindrical collar 160, the annular valve seat 120, the central hub 180, the valve seat 181 and the fixing bush of the umbrella valve 182 they consist of a single constructive element which is made in a single piece.

This makes it possible to build the inflation and unloading unit with a limited number of construction parts, thus limiting both the production costs and the assembly steps.

A unit according to FIGS. 3 to 7 can therefore be fixed to an inflatable equipment such as, for example, a diving buoy according to FIG. 1, replacing the inflation pipette terminal and the separate exhaust valve, providing only one opening and therefore a single welding zone in correspondence with which sealing problems may arise.

In addition to making the equipment safer, the manufacturing process is made simpler and faster and therefore production costs are lowered without compromising functionality.

Figure 8:
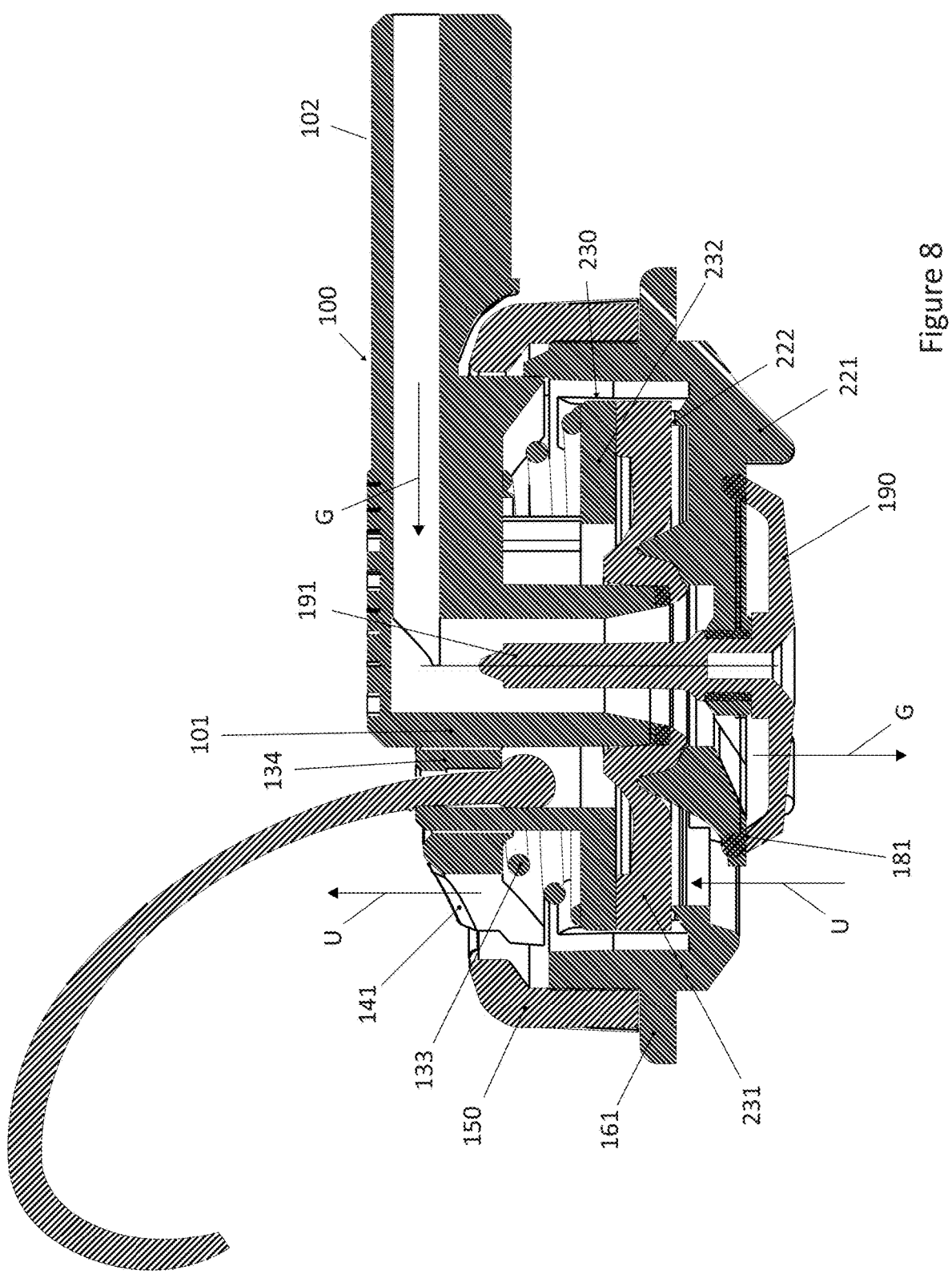
FIG. 8 shows a section similar to that of FIG. 7 of a variant embodiment of the valve according to FIG. 7.

With reference to FIG. 8, this figure illustrates a variant embodiment of the valve which provides for a different configuration of the valve seat and the shutter.

In FIG. 7, the valve seat is constituted by two annular elements spaced apart and concentric one to the other which elements define an annular opening 120 and the shutter is constituted by an annular gasket which overlaps the two annular elements and which is associated with an annular element support 132 on which a corresponding end of the helical spring 133 acts. The shutter thus performs an axial sliding along the portion 101 of the angled duct 100 and the gasket lifts with a translational movement in the direction of its axis, in the embodiment of FIG. 8, the configuration is such that the gasket indicated with 231 performs a lifting from the seat 222 only with its perimeter band or at least with a part of it.

In the central zone, the gasket 231 is held in a fixed manner between the end of the section 101 of the angled duct 100, which section is coaxial with the valve seat and the shutter, and an element 221 which is made in one piece with the end of the cylindrical collar 160 opposite the cover cap 140.

This element 221 forms a bottom wall provided with one or more outlet openings U and along its radially outermost edge it has the sealing lip 222 of the valve seat, while in the central area it forms a clamping ring 223 of the radially innermost edge of the gasket 231 against the end of the portion 101 of the inlet duct. This connection being made tight to fluid.

The same bottom element of the cylindrical collar which forms the valve seat and which holds the central area of the gasket 231 in sealing connection against the end of the portion 101 of the duct 100, forms also a fixing hub for the umbrella-shaped shutter 190 similarly to the provisions of the previous embodiment.

In substance, this alternative embodiment provides that the central hub carrying the umbrella valve 190 forms a sealing wall of a central annular band of the gasket 231 against the end of the portion 101 of the inlet duct 100. The spring and the annular element 230 act on the perimeter band of the gasket 231 so as to maintain said condition against lifting from the valve seat. By operating the tie rod, the ring 232 is raised and the gasket 231 can be pushed upwards by the internal pressure, distancing it from the valve seat and deforming it in a substantially conical way. The peripheral band moves towards the covering cap 140, while the central area of said gasket remains fixed in position.

The invention claimed is:

1. An assembly for inflation and discharge of inflation fluids for inflatable diving equipment, the assembly comprising:
    a two-way flow valve providing two flow paths comprising an inlet path and an exhaust path,
    wherein the valve includes a valve body having the inlet path and the exhaust path, which are separate from each other and are each disposed to receive flows having opposite directions,
    wherein the inlet path and the exhaust path are each provided with a non-return valve that prevents a flow in an opposite direction with respect to a flow direction foreseen for a respective flow path and that enables the flow to pass, automatically or on command, in the flow direction foreseen for the respective flow path,
    wherein each non-return valve has a valve seat defined in a predetermined position along the corresponding flow path, with the seat cooperating with a shutter, a combination of the shutter and the valve seat being configured to automatically close the flow of an inflation fluid having the opposite direction than that for which the corresponding flow path is intended,
    wherein one of the two flow paths is intended for passage of an inlet flow to a collection body comprising an inflatable bag or a rigid tank and has an end duct for coupling to a supply source of the inflation fluid having a predetermined supply overpressure,
    wherein the respective non-return valve automatically assumes a closing and opening position as a function of a pressure of the flow of the inflation fluid,
    wherein another one of the two flow paths is intended for the passage of a discharge or exit flow of the fluid from the collection body, the shutter of the non-return valve being stably and automatically urged against a corresponding valve seat, in a position of interdiction of the discharge or outlet flow, by an elastic element providing a predetermined force, the shutter being displaced to an open condition, which causes a spacing from the valve seat using manual, motorized or automatic command members of a displacement of the shutter according to a condition of overpressure of the fluid in the collection body when the overpressure generates a thrust force on the shutter greater than the thrust force exerted by the elastic element, and
    wherein the inflation and discharge unit has a rotationally symmetrical shape and the two flow paths are made coaxial to each other, the two flow paths comprising one central and radially innermost flow path ending on a side facing the collection body with a non-return valve with a diaphragm shutter which overlaps a face of a valve seat facing an inside of the collection body, on a side of the face facing the collection body, and an annular discharge flow path which has an annular passage opening and coaxially surrounds the central and radially innermost flow path, the two flow paths being separated by a tubular wall which externally delimits the central and radially innermost flow path and internally the annular discharge flow path.

2. The assembly according to claim 1, wherein a movement of the shutter of the non-return valve provided in the exhaust path, between two extreme positions of interdiction of the outlet flow and of release of the outlet flow, is determined only by a combination of the thrust force of the elastic element on the shutter in the closing direction of the non-return valve and by the force exerted by manual and/or motorized action against the force of the elastic element to move the shutter of the non-return valve in the open condition, a movement path of the shutter between the two extreme positions being devoid of removable mechanical stops.

3. The assembly according to claim 1,
wherein the valve seat associated to the annular discharge flow path is also annular in shape and cooperates with an annular shutter, the annular valve seat having an annular sealing lip with which an annular perimeter band of the annular shutter cooperates, the annular sealing lip extending radially further than at least one passage opening for the discharge annular flow path.

4. The assembly according to claim 3,
wherein the annular sealing lip is shaped as a disk which is stably fixed at a radially innermost diameter thereof, and
wherein the annular shutter cooperates with the annular sealing lip and can be raised from a position of contact with the annular sealing lip, in which the annular shutter generates a seal with the annular sealing lip, to a raised position from the sealing lip, in which the annular shutter opens a passage in a discharge or outlet direction.

5. The assembly according to claim 3, wherein the valve seat associated to the annular discharge flow path delimits the annular discharge flow path by having two concentric circular walls that are radially spaced apart, with two annular sealing lips that are intended to cooperate with the annular shutter which has a radial width sufficient to overlap both the two annular sealing lips of the valve seat associated to the annular discharge flow path and which is subjected to an action of an elastic element that stably urges the annular shutter in a closed position against the valve seat associated to the annular discharge flow path, from a side of the valve seat associated to the annular discharge flow path that is in opposite position inside the collection body.

6. The assembly according to claim 5, wherein the central flow path comprises an angled pipette-shaped conduit having a terminal branch coaxial to the annular flow path or to a corresponding annular valve seat and further having an opposite radial terminal branch which is oriented at 90° with respect to the terminal branch, a length of the coaxial branch being such that the radial terminal branch protrudes only for part of a diameter thereof in addition to an external dimensions of the assembly.

7. The assembly according to claim 6, wherein the annular flow path opens into an annular chamber which is internally delimited by a wall of the coaxial branch of the conduit for the central flow path, externally delimited by a cylindrical coaxial collar that internally carries the sealing lip radially outermost of the annular valve seat of the annular flow path and upperly delimited by a ring nut engaging a covering element and the angled conduit, the ring nut being removably fixed to the cylindrical collar, and wherein the covering element provides a stationary abutment for the elastic element, which stably urges the annular shutter against the annular valve seat and in which the cylindrical collar extends radially outwards into an annular fixing flange that seals with an annular band surrounding a passage opening in a wall of the collecting body.

8. The assembly according to claim 7, wherein, in a position radially adjacent to the coaxial branch of the angled conduit, the annular shutter has an axial extension which protrudes from the covering element and to which a manual actuation tie rod can be fixed for a manual displacement of the annular shutter in the open condition against an action of the elastic element.

9. The assembly according to claim 3, wherein, in combination with a single sealing lip coaxial to an axial portion of a central conduit, a gasket of the shutter cooperating with the sealing lip of the seat of the valve of the discharge flow path has a radially innermost annular edge that is fixed stably and sealingly to a wall of a coaxial section of the central conduit, a radially internal perimeter band, formed along the radially innermost annular edge, being clamped between the coaxial portion of the central conduit and a central hub connected to the cylindrical collar by radial ribs.

10. The assembly according to claim 6, wherein, in combination with a valve seat having an annular opening delimited by two coaxial sealing lips, the annular sealing lip of the annular seat that is radially innermost is provided on a coaxial central hub held in position by radial ribs connected to the cylindrical collar or to the radially outermost sealing lip of the annular valve seat.

11. The assembly according to claim 10, wherein the central hub has a conical extension coaxial to the coaxial branch of the angled conduit and has a coaxial bushing for fixing a central appendix of a diaphragm shutter consisting of a circular disk.

12. The assembly according to claim 11, wherein the valve seat associated with the non-return valve for the innermost flow path through the angled conduit and cooperating with the diaphragm shutter is provided integrally shaped on a side of the central hub facing toward an inside of the collection body.

13. The assembly according to claim 12, wherein the valve seat for the shutter is radially coincident with the radially internal sealing lip of the annular valve seat, being the sealing lip radially internal of the annular valve seat and the valve seat of the shutter being provided on opposite sides of a radial annular widening of the central hub.

14. Inflatable diving equipment, comprising:
an inflatable bag with an inflation and discharge opening to which an inflation and discharge assembly is sealingly fixed, wherein the assembly is made according to claim 1.

15. The inflatable diving equipment according to claim 14, wherein the inflatable diving equipment is configured as a buoy.

16. The inflatable diving equipment according to claim 14, wherein the inflatable diving equipment is configured as a diving buoy.

* * * * *